United States Patent Office 3,338,249
Patented Aug. 29, 1967

3,338,249
FILTER MATERIAL FOR TOBACCO SMOKE
Hans Erlenmeyer, 17 Augustinergasse,
4000 Basel, Switzerland
No Drawing. Filed Mar. 15, 1965, Ser. No. 439,958
4 Claims. (Cl. 131—261)

The filter elements known to date for the detoxication of tobacco smoke consist of materials which are meant to free tobacco smoke from nicotine and other harmful components by chemical binding, precipitation, or adsorption. Among others, also silica gel has been used for this purpose.

In 1955, F. H. Dickey succeeded in demonstrating that methyl orange was adsorbed specifically by silica gel if silica gel was prepared in the presence of the methyl orange to be adsorbed and was subsequently freed from that dye to a large extent by extraction. Experiments have shown that this phenomenon may be generalized to some extent. It has been shown, in particular, that aromatic heterocycles, such as nicotine, are adsorbed specifically by silica gels, which were prepared in their presence, from aqueous hydrochloric acid solution.

However, it was not to be foreseen at all that a gel, which had been coagulated in the presence of nicotine and had adsorbed nicotine selectively from aqueous solutions, would also be able to bind nicotine selectively from the smoke phase. However, such a specific ability of a gel, prepared in the above-mentioned manner, to produce adsorption from the smoke phase could be proven without difficulty.

Therefore, the present invention concerns a filter material, on the basis of silica gel, for the adsorption of nicotine and other harmful components such as 3,4-benzpyrene from tobacco smoke whereby the silica gel is impregnated with nicotine, for example, nicotinic acid derivatives such as amide or diethylamide, or a compound such as acridine or a benzoquinoline, for example, 3,4-, 5,6- or 7,8-benzoquinoline.

In addition, the invention refers to the use of this impregnated silica gel as filter material for the adsorption of nicotine and other harmful components such as 3,4-benzpyrene from tobacco smoke. A gel impregnated with nicotine or a nicotine-like substance adsorbs nicotine specifically from tobacco smoke; a gel impregnated with acridine or 5,6-benzoquinoline adsorbs 3,4-benzpyrene specifically from tobacco smoke.

Filters made of selectively adsorbing silica gels, prepared according to the invention, have the advantage of allowing the light hydrocarbons (to which the aroma of the smoke is to be ascribed) to pass and of increasingly retaining only nicotine, nicotine-like substances and 3,4-benzpyrene-like hydrocarbons which are partially held responsible for cancer formation. They may be incorporated in filter elements for cigarettes, cigars, holders, pipes, and the like.

By an impregnated silica gel, one understands, according to the invention, a silica gel regarding which the process of gel formation is carried out in the presence of the impregnating substance, i.e., in the presence of nicotine, a compound having a structure similar to that of nicotine, acridine or 5,6-benzoquinoline. During syneresis and formation of xerogel, which occurred during drying, the impregnating substance remains in the gel skeleton and, thus, impresses its molecular form into the finished gel skeleton. It is removed before final use during rinsing of the dry gel. Silica gel, prepared in this manner, is referred to as impregnated gel.

Gel preparation may be carried out according to methods which are known per se, for example, by acidification of a dilute alkali-silicate solution, hydrolysis of silicium tetrachloride or hydrolysis of silicic acid esters. It is advantageous to add the organic substance, intended for impregnation, to one of the two reaction components. When one obtains, for example, the gel from an alkali-silicate solution by mixing it with dilute mineral acid, such as hydrochloric acid, one will add the organic substance, intended for impregnation, to the alkali-silicate solution provided that one is concerned with a compound which is sensitive to acid. If the compound is not sensitive to acid, i.e., if it is sensitive to alkali, it may be added also to the mineral acid used for the hydrolization process. If an especially sensitive organic substance is involved, it is recommendable to add the substance to the reaction components, which have been mixed already, before gel formation has started.

Example 1

Forty-three parts of technical water glass (40° Beaumé), 170 parts of water, and 130 parts of half-concentrated hydrochloric acid (in which 0.5 part of nicotine were dissolved) were mixed with strong stirring. The mixture was allowed to coagulate for 6 to 8 days. The gel formed was dried and extracted subsequently with a solvent, for example, methanol, hydrochloric acid, or other dilute mineral acids.

The silica gel, prepared in this manner, was used for the following experiment:

Ten cigarettes of identical particle size (corresponding to 10 g. tobacco) each were smoked whereby the smoke was drawn through a filter which contained 0.1 g. silica gel and was attached to the cigarette. A 2 mm. cellulose filter was placed in front of the silica gel and a 4 mm. cellulose filter was placed behind it. In one case, the silica gel consisted of the gel impregnated with nicotine, whereas the other filter contained a control gel which had been prepared correspondingly.

In the principal smoke stream, coming out behind the filter with the control gel, 65.51 mg. nicotine was found, whereas the filter containing the silica gel which had been impregnated with nicotine, allowed only 56.93 mg. nicotine to pass. Thus, there was a 13% increase in adsorption.

Example 2

In a manner analogous to Example 1, a silica gel was prepared impregnated with nicotine and a corresponding control gel.

The gels prepared in this manner were tested in cigarettes without filters. The filter was placed in a holder. The silica gel (0.3 g., 14 mm.) was covered with a 1 mm. cellulose filter in the front and with a 2 mm. cellulose filter in the back. Five and five-tenths centimeters were smoked of the cigarettes which were 7 cm. long.

The nicotine weight for 10 g. tobacco was 36.48 mg. Of this, the following was found in the principal smoke stream:

|  | Nicotine, mg. |
|---|---|
| Filter with control gel | 33.53 |
| Filter with impregnated silica gel | 31.28 |

Thus, nicotine adsorption of the silica gel impregnated with nicotine was 10.7% more marked than that of the control gel.

During a corresponding smoking experiment with a commercial cellulose acetate filter, there was noted a 41.30 mg. nicotine passage.

Example 3

Forty-three parts of technical sodium silicate (40° Beaumé) are mixed during strong agitation with 170 parts of water and 130 parts of half concentrated hydrochloric acid in which 0.5 part of acridine are dissolved.

The mixture is allowed to coagulate for 6 to 8 days. The resulting gel is dried and then extracted with a suitable solvent, for example, methanol, hydrochloric acid or another dilute mineral acid.

The silica gel made in this manner is used as a filter material to adsorb 3,4-benzpyrene specifically from tobacco smoke.

*Example 4*

Forty-three parts of technical sodium silicate (40° Beaumé) are mixed during strong agitation with 170 parts of water and 130 parts of half concentrated hydrochloric acid in which 0.3 part of acridine and 0.3 part of nicotine are dissolved. The mixture is allowed to coagulate for 6–8 days. The resulting gel is dried and then extracted with a suitable solvent, for example, methanol, hydrochloric acid or another dilute mineral acid.

The silica gel made in this manner is used to adsorb both nicotine and 3,4-benzpyrene specifically from tobacco smoke.

What is claimed is:

1. A filter material for the detoxication of tobacco smoke comprising a silica gel including therein impressions corresponding to the molecular form of an aromatic heterocycle.
2. A filter material for the detoxication of tobacco smoke comprising a silica gel including therein impressions corresponding to the molecular form of nicotine.
3. A filter material for the detoxication of tobacco smoke comprising a silica gel including therein impressions corresponding to the molecular form of acridine.
4. A filter material for the detoxication of tobacco smoke comprising a silica gel including therein impressions corresponding to the molecular forms of nicotine and acridine.

References Cited

UNITED STATES PATENTS

| | | | |
|---|---|---|---|
| 2,770,241 | 11/1956 | Winkler | 131—265 |
| 2,956,329 | 10/1960 | Touey | 131—267 X |
| 3,243,262 | 3/1966 | Carr et al. | 23—182 |

SAMUEL KOREN, *Primary Examiner.*

D. J. DONOHUE, *Assistant Examiner.*